United States Patent
Terada et al.

(10) Patent No.: US 7,002,709 B1
(45) Date of Patent: Feb. 21, 2006

(54) IMAGE PROCESSING SYSTEM, IMAGE PROCESSING METHOD, AND IMAGE INPUT SYSTEM

(75) Inventors: Yoshihiro Terada, Ebina (JP); Kenji Ebitani, Ebina (JP); Kazuman Taniuchi, Ebina (JP); Hiroyoshi Uejo, Ebina (JP); Junichi Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/437,216

(22) Filed: Nov. 10, 1999

(30) Foreign Application Priority Data

Dec. 7, 1998 (JP) .................................. 10-347637

(51) Int. Cl.
H04N 1/40 (2006.01)

(52) U.S. Cl. ...................................... 358/3.28; 358/1.9
(58) Field of Classification Search ................. 358/1.9, 358/3.28, 2.1; 382/100–102
See application file for complete search history.

(56) References Cited

U.S. PATENT DOCUMENTS

| | | | | |
|---|---|---|---|---|
| 4,678,322 A | * | 7/1987 | Finkel et al. ................ | 355/133 |
| 5,075,787 A | * | 12/1991 | Shaughnessy et al. ....... | 358/452 |
| 5,091,746 A | * | 2/1992 | Watanabe ..................... | 399/83 |
| 5,138,465 A | * | 8/1992 | Ng et al. ...................... | 358/453 |
| 5,471,281 A | * | 11/1995 | Hayashi et al. .............. | 399/366 |
| 5,532,920 A | * | 7/1996 | Hartrick et al. .............. | 715/500 |
| 5,617,187 A | * | 4/1997 | Hayashi et al. ................ | 399/32 |
| 5,647,010 A | * | 7/1997 | Okubo et al. ................ | 382/100 |
| 5,650,863 A | * | 7/1997 | Utagawa et al. ............ | 358/475 |
| 5,754,308 A | * | 5/1998 | Lopresti et al. ............. | 358/403 |

FOREIGN PATENT DOCUMENTS

| | | |
|---|---|---|
| JP | 2633222 | 4/1997 |
| JP | 11-73503 | 3/1999 |

* cited by examiner

Primary Examiner—Thomas D. Lee
Assistant Examiner—Stephen Brinich
(74) Attorney, Agent, or Firm—Morgan Lewis & Bockius LLP (57) ABSTRACT

The reproduction of a copy inhibit image and the abuse of data through a network are to be prevented without sacrificing various page editing functions. An image read unit scans an original placed on an original carrying table and thereby generates RGB color image signals of multi-value. An image processing unit performs various image processing and, upon detection of a copy inhibit original, performs image working for preventing faithful reproduction of the copy inhibit original. An image storing unit temporarily stores page by page original images provided from the image processing unit. If a copy inhibit image is contained in the original images, the image working is performed by the image processing unit to prevent faithful reproduction and the images after the image working are stored in the image storing unit. An image output unit performs a printing operation in accordance with image data outputted from the image processing unit.

5 Claims, 10 Drawing Sheets

IMAGE PROCESSING SYSTEM, IMAGE PROCESSING METHOD, AND IMAGE INPUT SYSTEM

BACKGROUND OF THE INVENTION

1. Field of the Invention

The present invention relates to an image processing system, an image processing method, and an image input system, having a function of discriminating whether an input image is a specific original image which should not be copied.

2. Description of the Related Art

Recently, a color image copying system of high performance has become popular, and with improvement in image quality of image input/output devices, it has become possible to take a faithful copy of an original image. On the other hand, it has become more and more important socially to prevent forgery of paper money and valuable securities by abusing such an image copying system. In view of this point, various inventions have been proposed in which at the time of digitally reading and copying a color original, a specific pattern contained in the read original image is identified, and when the pattern is judged to be a copy inhibit pattern such as paper money or a valuable security, the reproduction (copy output) of the image is stopped.

Figure 12:
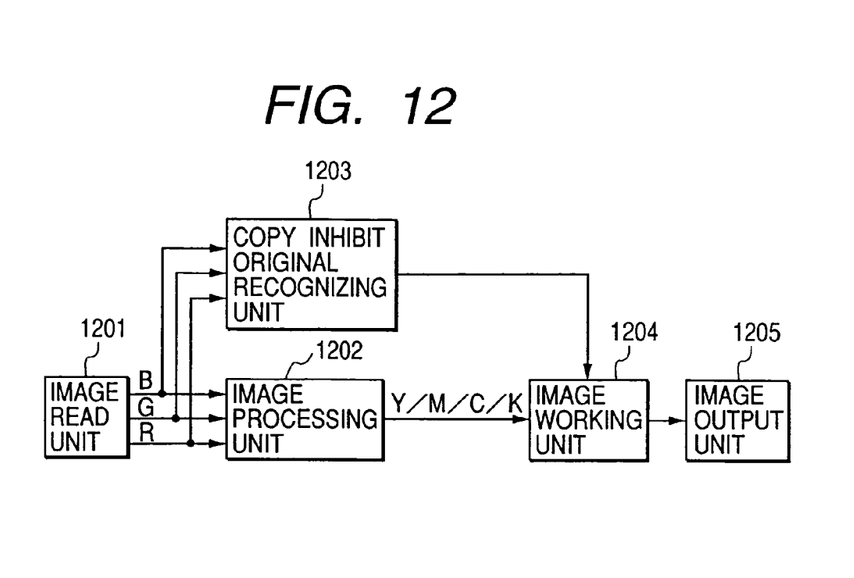
FIG. 12 is a block diagram showing a schematic configuration of a conventional typical color copying system.

The related art will now be described with reference to FIG. 12, which is a block diagram showing a schematic configuration of a typical color copying system. In the same figure, the color copying system mainly comprises an image read unit 1201 which generates digital image signals of red (R), green (G) and blue (B) from an original image, an image output unit 1205 which reproduces a full-color image using colorants of yellow (Y), magenta (M), cyan (C) and black (K), and an image processing unit 1202 which produces YMCK image signals from the RGB image signals. In this color copying apparatus, every time the original is scanned in the image read unit 1201, signals for output are generated successively in the order of Y→M→C →K in the image processing unit 1202 and printing operation is performed in the image output unit 1205. Thus, copying of a full-color original is effected by scanning the original four times.

A copy inhibit original recognizing unit 1203 analyzes RGB signals outputted from the image read unit 1201 and judges whether a copy inhibit image such as paper money or a valuable security is included in the original image. The copy inhibit original recognizing unit 1203 performs processing for detecting a specific pattern in a copy inhibit original at the time of first and second scans of the original. An image working unit 1204 is for painting out an image signal with a preset specific value. If it is recognized in the copy inhibit original recognizing unit 1203 that a copy inhibit image is contained in the original image, the image signal is painted out with C and K which are the third and fourth printing colors, respectively. By adopting such a configuration, it becomes possible to prevent copying of copy inhibit matters such as paper money and valuable securities.

Figure 13:
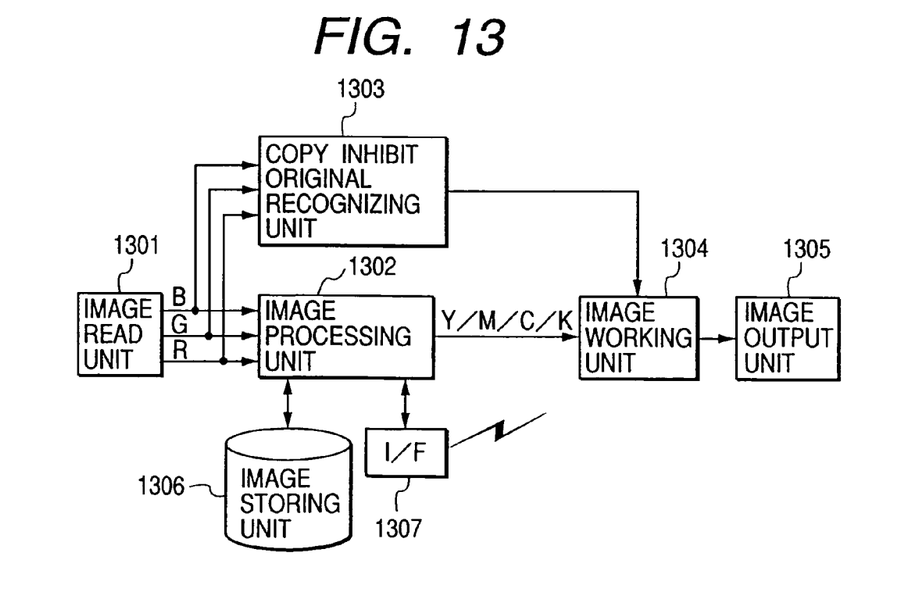
FIG. 13 is a block diagram showing a schematic configuration of a conventional color image processing system which stores images page by page and which permits such page editing operations as gathering, stacking and composition.

However, with the recent advance and spread of the digital/network technique, there is now an increasing tendency to constructing a color copying apparatus in a more systematized form, more particularly, in a form permitting not only copying of an original but also page editing. FIG. 13 is a block diagram showing a schematic configuration of a color image processing system which stores images page by page and which permits page editing such as gathering, stacking and composition. In addition to the configuration shown in FIG. 12, the color image processing system illustrated in FIG. 13 is provided with an image storing unit 1306 and an interface 1307 for the transmission and reception of image data to and from external devices connected to a network. The image read unit 1301, image processing unit 1302, copy inhibit original recognizing unit 1303, image working unit 1304, and image output unit 1305, are the same as in FIG. 12.

In connection with the color image processing system shown in FIG. 13, for example, it is here assumed that page editing is performed for 2up composition (outputting two pages of original images on one side of output paper) using plural sheets of originals. In this case, the reproduction of a copy inhibit original may be prevented by a method of preventing the copy of all the original images or a method of preventing the copy of only the original images judged to be copy inhibit images. The former method adopts the same configuration as in the related art and can thereby prevent the reproduction of a copy inhibit original, but is not preferred because the reproduction of images other than the copy inhibit images is also affected. The latter method prevents the reproduction of only a copy inhibit original, but to this end it is necessary to separately store information regarding in what page of original a copy inhibit image is contained, and perform image working responsive to the stored contents. As a result, there arises the problem that the system configuration and control become complicated.

In the color image processing system shown in FIG. 13, if the transmission and reception of image data are to be conducted via a network for example, even image data judged to be a copy inhibit data is transmitted as it is. As a result, it becomes possible for a destination color printer to reproduce the copy inhibit original and eventually an illegal forgery act becomes possible through the network.

SUMMARY OF THE INVENTION

The present invention has been accomplished in view of the above-mentioned circumstances and provides an image processing system, an image processing method, and an image input system, which permit even a systematized and networked color copy system to prevent the reproduction of a copy inhibit image and also prevent improper use of data using an external device connected to a network, without sacrificing various page editing functions thereof.

The image processing system of the present invention has an image data generating part that scans an original image and generates image data corresponding to the original image, and a discriminating part that, using the image data generated by the image data generating part, discriminates whether a predetermined inhibit image is present in the original image or not. The system also has a working part that, if it is judged by the discriminating part that the inhibit image is present in the original image, works on the image data to render an image distinctly different from the original image and then outputs the image data thus obtained, and that, if it is judged by the discriminating part that the inhibit image is not present in the original image, outputs the image data as it is generated by the image data generating part, and a storing part that stores page by page the image data outputted from the working part.

The image processing method of the present invention includes a first step of inputting image data corresponding to an original image, and a second step of discriminating whether a predetermined inhibit image is present or not in the inputted image data. The method further includes a third step of, if it is judged that the inhibit image is present in the inputted image data, working on the image data to render an image distinctly different from the original image and outputting the image data thus obtained, a fourth step of, if it is judged that the inhibit image is not present in the inputted image data, outputting the inputted image data as it is, and a fifth step of storing page by page the image data outputted in the third or the fourth step.

The image input system of the present invention has an image data generating part that scans an original image and generates image data corresponding to the original image, and a discriminating part that, using the image data generated by the image data generating part, discriminates whether a predetermined inhibit image is present in the original image or not. The image input system also has a working part that, if it is judged by the discriminating part that the inhibit image is present in the original image, works on the image data to render an image distinctly different from the original image and then outputs the image data thus obtained, and that, if it is judged by the discriminating part that the inhibit image is not present in the original image, outputs the image data as it is generated by the image data generating part.

According to the present invention, upon detection of a copy inhibit original, working for preventing the reproduction of the copy inhibit image is performed and thereafter image data is stored in the storing part, so even in a systematized and networked color copying system, it becomes possible to prevent the reproduction of a copy inhibit image without sacrificing various page editing functions of the system and also possible to prevent improper use of data using an external device connected to a network.

BRIEF DESCRIPTION OF THE DRAWINGS

Preferred embodiments of the present invention will be described in detail based on the following drawings.

DETAILED DESCRIPTION OF PREFERRED EMBODIMENTS

Embodiments of the present invention will be described hereunder with reference to the accompanying drawings.

A. FIRST EMBODIMENT

A-1. Constitution of the First Embodiment

Figure 1:
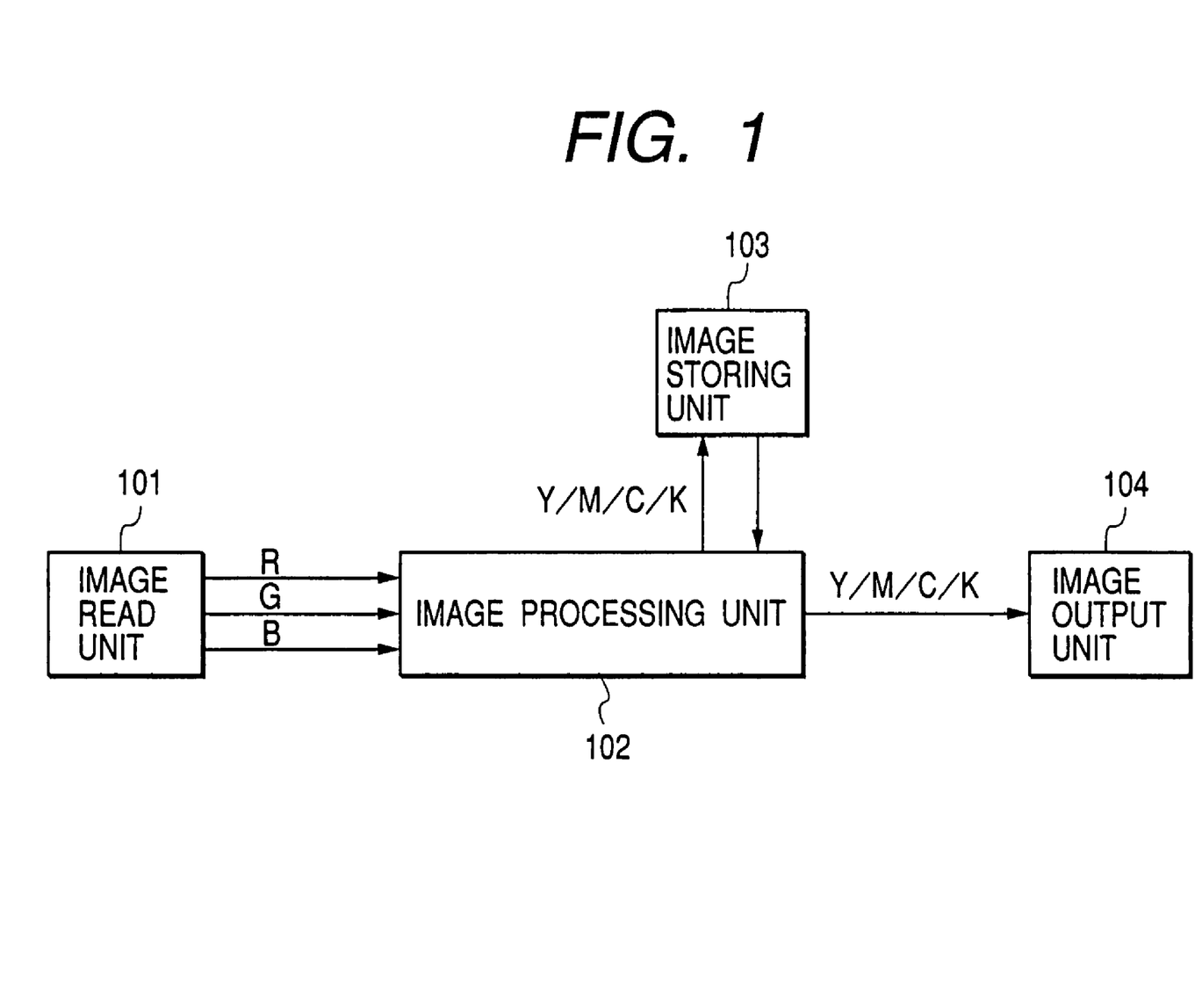
FIG. 1 is a block diagram showing the configuration of a color image copying system having an image output unit of an electrophotographic type to which an image processing system according to the first embodiment of the present invention is applied.

FIG. 1 is a block diagram showing the configuration of a color image copying system having an image output unit of an electrophotographic type to which an image processing system according to the first embodiment of the present invention is applied. In the same figure, the color image copying system comprises an image read unit 101, an image processing unit 102, an image storing unit 103, and an image output unit 104. The image read unit 101 comprises an original carrying table, a light source, CCD line sensors, and an A/D (analog/digital) converter. In the image read unit 101, an original is scanned in a direction (subscanning direction) orthogonal to an arranged direction (main scanning direction) of one-dimensional line sensors to generate multi-value RGB color image signals of 400 dpi (dot/inch) and 8 bits (256 gray scales)/pixel in each color, in which the original image is color-separated into three primary colors of red (R), green (G) and blue (B).

The image processing unit 102 receives the RGB signals outputted from the image read unit 101 after scanning the original, then generates Y, M, C and K signals, and provides the signals to the image storing unit 103 after subjecting the signals to an image processing (color characteristic correction, under color removal, scaling, and space correction) so that the original is reproduced satisfactorily in the image output unit 104 which will be described later, and if necessary, after subjecting the signals to an image working for preventing a faithful reproduction. Further, the image processing unit 102 reads image data stored in the image storing unit 103 and provides them to the image output unit 104 in the order of Y→M→C→K. The image working indicates processing which is executed when a copy inhibit image is contained in the original image. According to this processing, for example, the gray scale of C (Cyan) signal as the third printing color is inverted and then the signal is outputted to prevent copy of the copy inhibit image, that is, to prevent faithful reproduction of the copy inhibit original.

The image storing unit 103 is for receiving and storing the Y, M, C and K signals from the image processing unit 102 after the above image processing. When page editing function such as sorting, e.g. stacking or gathering, or image rotation, Nup, signature, or both-side printing is selected by an operating unit (not shown), the image storing unit 103 temporarily stores page by page the original images of all the pages read by the image read unit 101. At this time, if a copy inhibit image is contained in the original images, image data is stored after the foregoing image processing is performed by the image processing unit 102. If the above page editing is selected, then in the image storing unit 103, original images are read out in a predetermined printing order and are outputted to the image processing unit 102 after having been subjected to required processing such as image rotation or composition. In other cases, for example when one sheet of an original is to be copied only partially, not requiring a temporary storage of image, Y/M/C/K signals are not fed to the image storing unit 103 and thus such image data is not stored in the image storing unit 103.

In accordance with Y/M/C/K signals outputted from the image processing unit 102 the image output unit 104 performs printing operations four times in the order of Y→M→C→K using four-color toners of yellow (Y), magenta (M), cyan (C), and black (K), thus printing a full-color image. In the case where printing is made while reading an original, both scanning by the image processing unit 102 and printing operation by the image output unit 104 are synchronized with each other.

Figure 2:
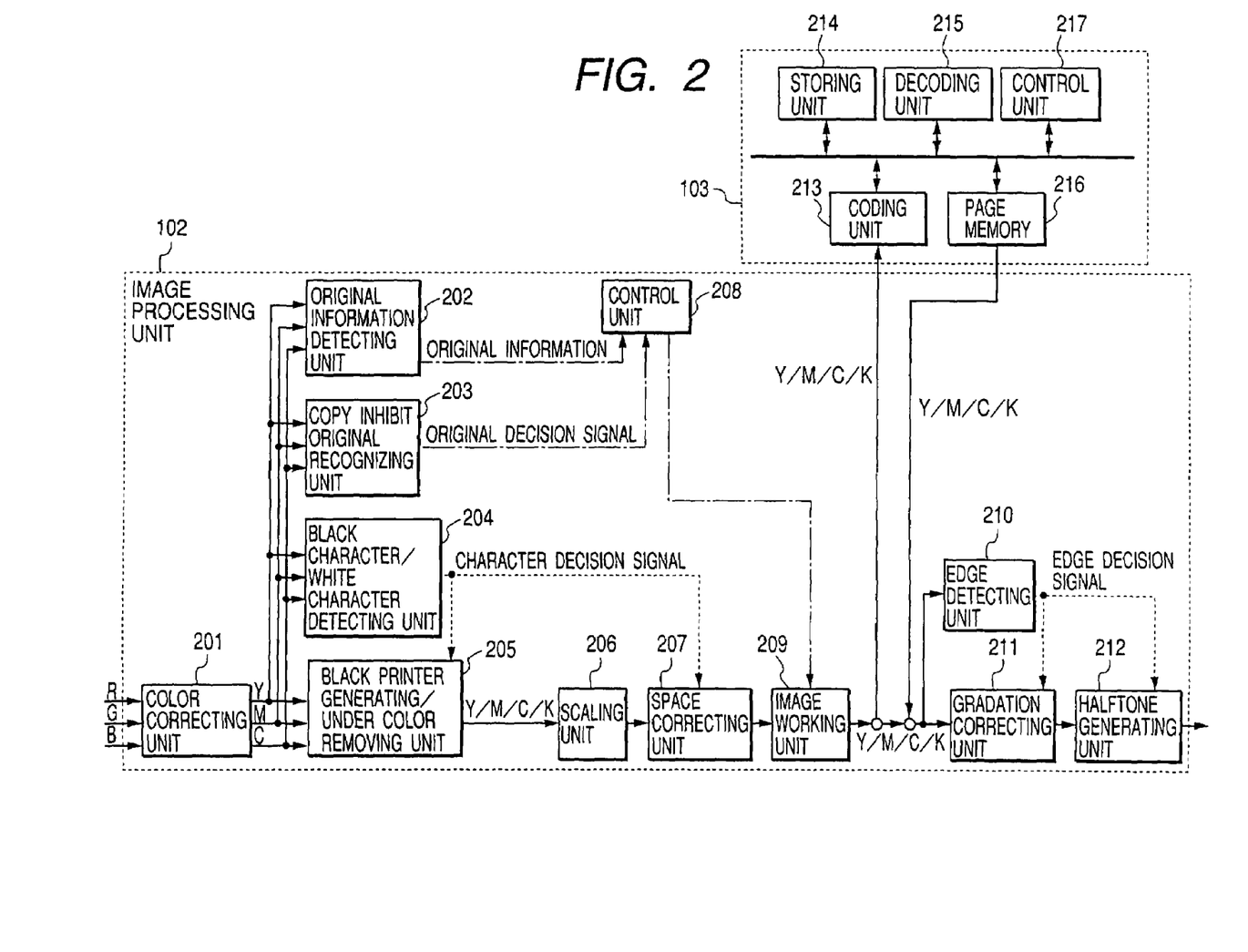
FIG. 2 is a block diagram showing the configuration of an image processing unit 102 and that of an image storing unit 103.

The image processing unit 102 and the image storing unit 103 will now be described in detail with reference to FIG. 2. FIG. 2 is a block diagram showing the configuration of the image processing unit 102 and that of the image storing unit 103, the image processing unit 102 receiving RGB signals from the image read unit 101 and outputting Y/M/C/K signals successively to the image output unit 104. In the same figure, the image processing unit 102 comprises a color correcting unit 201, an original information detecting unit 202, a copy inhibit original recognizing unit 203, a black character/color character detecting unit 204, a black generating/under color removing unit 205, a scaling unit 206, a space correcting unit 207, a control unit 208, an image working unit 209, an edge detecting unit 210, a gradation correcting unit 211, and a halftone generating unit 212.

In accordance with the following expression, the color correcting unit 201 produces YMC signals of 400 dpi and 8 bits/pixel in each color as signals obtained by color correction from RGB signals and provides those signals to each of the original information detecting unit 202, copy inhibit original recognizing unit 203, black character/color character detecting unit 204, and black generating/under color removing unit 205.

$$\begin{bmatrix} Y \\ M \\ C \end{bmatrix} = \begin{bmatrix} \alpha 11 & \alpha 12 & \alpha 13 & \alpha 14 & \alpha 15 & \alpha 16 & \alpha 17 & \alpha 18 & \alpha 19 \\ \alpha 21 & \alpha 22 & \alpha 23 & \alpha 24 & \alpha 25 & \alpha 26 & \alpha 27 & \alpha 28 & \alpha 29 \\ \alpha 31 & \alpha 32 & \alpha 33 & \alpha 34 & \alpha 35 & \alpha 36 & \alpha 37 & \alpha 38 & \alpha 39 \end{bmatrix} \times \begin{bmatrix} B \\ G \\ R \end{bmatrix} + \begin{bmatrix} \beta 1 \\ \beta 2 \\ \beta 3 \end{bmatrix}$$ [Expression 1]

where α1 to α2 and α1 to β3 stand for color correction factors which are determined from the characteristics of the image read unit 101 and the image output unit 104.

The original information detecting unit 202 detects, from the above YMC signals, information necessary for the copying of an original such as the size of the original, the position of the original on an original carrying table, and whether the original image is a black and white image or a color image, and provides the information to the control unit 208. On the basis of the above YMC signals the copy inhibit original recognizing unit 203 judges whether a copy inhibit image, or an image not to be copied, such as paper money or valuable securities, is contained in the original image or not, and provides the result of the judgment to the control unit 208.

The black character/color character detecting unit 204 produces a lightness signal from the YMC signals, and in accordance with the lightness signal, detects character elements contained in the original image, further, makes a color/black discrimination and provides as a final result a character decision signal indicating black and color characters to each of the black generating/under color removing unit 205 and the space correcting unit 207. The details of the black character/color character detecting unit 204 will be described later. The black generating/under color removing unit 205 extracts a gray component from the YMC signals outputted from the color correcting unit 201, then produces four-color, Y/M/C/K, signals of 400 dpi and 8 bits/pixel and provides them to the scaling unit 206. The details of the black generating/under color removing unit 205 will be described later. The scaling unit 206 subjects the Y/M/C/K image signals outputted by the black generating/under color removing unit 205 to one-dimensional image magnification varying processing (expansion and contraction) in the main scanning direction with use a known linear interpolation calculation and also performs two-dimensional image magnification varying processing (expansion and contraction) in synchronism with a scanning speed control in the subscanning direction made in the image read unit 101.

Figure 5:
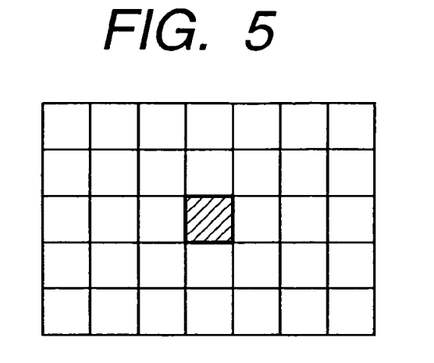
FIG. 5 illustrates definition correction by a space correcting unit 207.

The space correcting unit 207, which is for the correction of definition, makes a convolution calculation of 5×7 pixels (pixels in the subscanning direction×pixels in the main scanning direction) centered at a certain pixel to be noted as in FIG. 5, thereby correcting definition with respect to blur and ruggedness of image. To be more specific, the space correcting unit 207 receives the result of judgment (a character decision signal) from the black character/color character detecting unit 204 and, if the judgment result indicates a black character or a color character, the space correcting unit 207 selects a filter factor for enhancement and executes correcting processing, while if the judgment is negative, the space correcting unit 207 selects a filter factor for smoothing and executes correcting processing, thereby reproducing characters and line drawings more sharply and pixels in a pattern area more smoothly.

The control unit 208 controls various components of this system. Particularly, in accordance with an original decision signal the control unit 208 judges whether a copy inhibit image is contained in an original image or not, and on the basis of the result of the judgment it controls image working in the image working unit 209. Under control which is made by the control unit 208 on the basis of the result of recognition provided from the copy inhibit original recognizing unit 203, and if a copy inhibit image is contained in the original image, the image working unit 209 inverts the gradation of C (Cyan) signal as a third printing color signal for example and then outputs the signal, thus working on the image to prevent a faithful reproduction, or copying, of the inhibit original.

The edge detecting unit 210 determines edge pixels contained in the inputted Y/M/C/K signals. It detects edge pixels by floating binarization and pattern matching in surrounding 5×5 pixels (pixels in the subscanning direction and pixels in the main scanning direction) centered at a certain pixel to be noted, then produces an edge decision signal of one bit for each pixel indicating whether each pixel is an edge pixel or a non-edge pixel, and provides such edge decision signals to the gradation correcting unit 211 and the halftone generating unit 212.

The gradation correcting unit 211, which is implemented by a one-dimensional LUT (look-up table), corrects the gradation characteristic of an output image in association with processing carried out in the image output unit 104 and the halftone generating unit 212 which will be described later. In synchronism with an image signal and in accordance with an edge decision signal provided from the edge detecting unit 210, the gradation correcting unit 211 performs correcting processing for a non-edge pixel to render a reproduced image faithful to the original image, while for an edge pixel it performs correcting processing so as to enhance the contrast, and then provides the thus-corrected signal to the halftone generating unit 212.

The halftone generating unit 212 produces binary signals of Y/M/C/K for printing in the image output unit 104. More specifically, from an inputted multi-value image signal of 8 bits/pixel the half tone generating unit 212 produces a binary image signal for output to the image output unit 104. This is implemented by the known dither processing which compares a pixel value with a predetermined threshold matrix. Two types of threshold matrices are provided in advance, one of which is a threshold matrix giving priority to resolution and the other is a threshold matrix giving priority to the number of gray scales. In accordance with the edge decision signal which is provided from the edge detecting unit 210 in synchronism with the image signal, the halftone generating unit 212 performs, for an edge pixel, binarization processing by using the threshold matrix with priority given to resolution, while for a non-edge pixel it performs binarization processing by using the threshold matrix with priority given to the number of gray scales.

The image storing unit 103 comprises a coding unit 213, a storing unit 214, a decoding unit 215, a page memory 216, and a control unit 217. The coding unit 213 encodes (compresses) inputted Y/M/C/K signals page by page and color by color in accordance with a predetermined coding method typical of which is JPEG, and outputs the thus-coded image data to the storing unit 214, which in turn stores page by page the image data coded (compressed) by the coding unit 213. The storing unit 214 is a large capacity storage part capable of storing plural pages of original images. For example, it is implemented by a hard disk device.

The decoding unit 215 reads out image data stored page by page in the storing unit 214 and decodes the Y/M/C/K image signal in accordance with a predetermined expanding method, then outputs an image signal to the page memory 216, which in turn stores one decoded page of images. The page-by-page image data once stored in the page memory 216 is outputted to the image processing unit 102 in synchronism with the printing operation of the image output unit 104. The control unit 217 controls the above processing units and buses for connection thereto.

Figure 3:
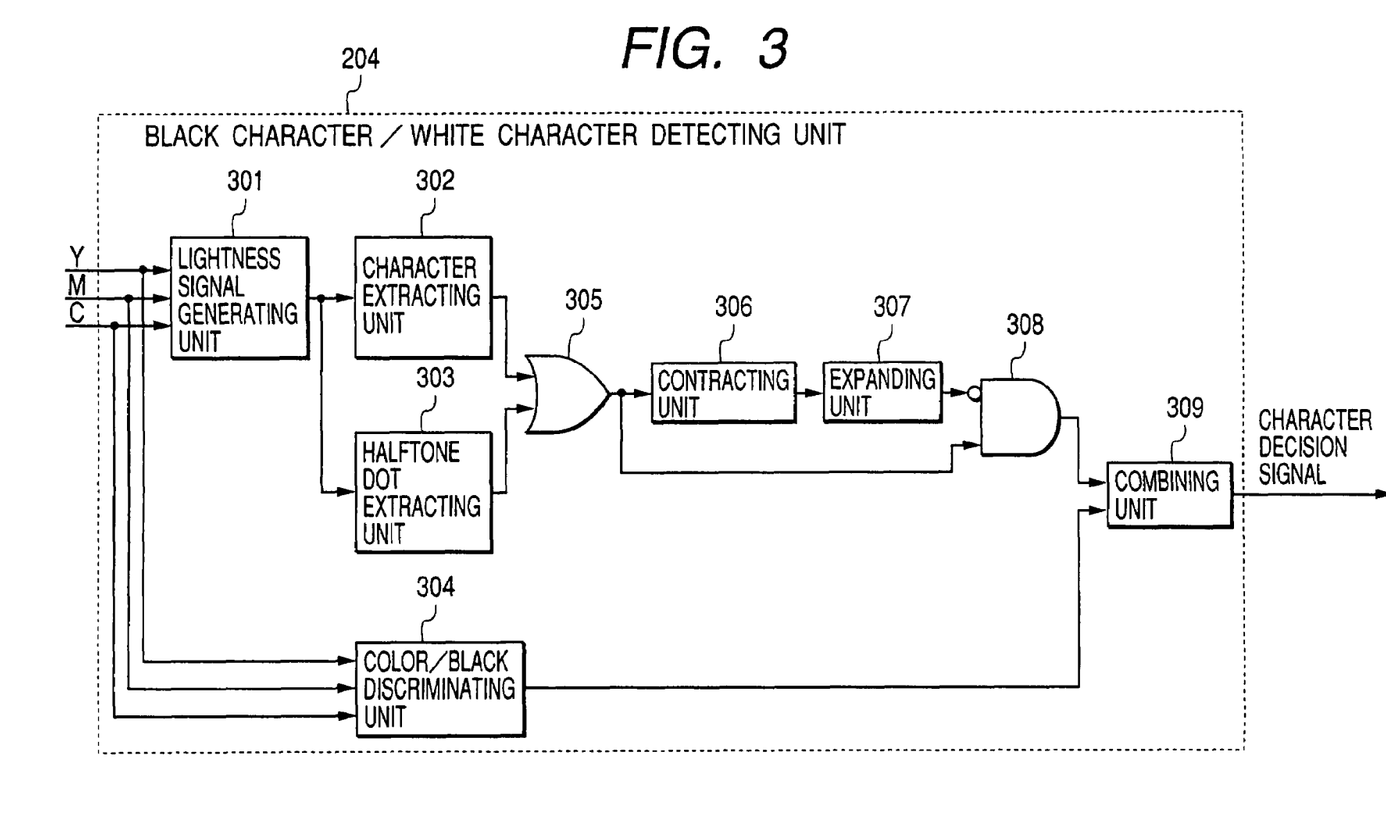
FIG. 3 is a block diagram showing a configuration example of a black character/color character detecting unit 204.

Reference is now made to FIG. 3, which is a block diagram showing a configuration example of the black character/color character detecting unit 204. In the same figure, the black character/color character detecting unit 204 comprises a lightness signal generating unit 301, a character extracting unit 302, a halftone dot extracting unit 303, a color/black discriminating unit 304, an OR circuit 305, a contracting unit 306, an expanding unit 307, an AND circuit 308, and a combining unit 309.

The lightness signal generating unit 301 produces a lightness signal by such a primary linear calculation as (lightness signal)=a×Y+b×M+c×C+d, where a, b, c, and d are preset multiplication and addition coefficients. The color/black discriminating unit 304 compares the difference between maximum and minimum values of inputted YMC signals with a predetermined threshold value, thereby judges whether the pixel concerned is of a chromatic color or an achromatic color, and produces a color/black decision signal of each pixel one bit.

In accordance with the lightness signal the character extracting unit 302 calculates, for example, the OR of a fixed binarization result using a predetermined threshold value and a floating binarization result using a peripheral pixel mean value as a threshold value, and thereby extracts elements (characters) of a high gradation level such as characters, line drawings and paint-out contained in images. The halftone dot extracting unit 303 discriminates whether a pixel concerned lies in a halftone dot area or not, on the basis of coarseness/fineness or periodicity of a binary image signal, and thereby extracts a halftone dot component contained in the image, for example as in Japanese Unexamined Patent Application No. Hei 09-231361 filed by the applicant of the present case.

The OR circuit 305 calculates the OR of the character signal and the halftone dot signal extracted respectively in the character extracting unit 302 and the halftone dot extracting unit 303 and provides the result to the contracting unit 306, which in turn performs contracting processing by calculating an ANDed value in 21×21 size for example. The expanding unit 307 performs expanding processing by calculating an ORed value in 33×33 size for example. The AND circuit 308 ANDs NOT of a signal after the logical operations in the contracting unit 306 and the expanding unit 307 with a composite signal of character signal and halftone dot signal which composite signal is outputted from the OR circuit 305, to generate a one-bit signal (a character pixel signal) indicative of a character pixel. The combining unit 309 combines the character pixel signal with the color/black decision signal, thereby produces and outputs a 2-bit character decision signal for each pixel which signal indicates any of "black character," "color character," and "others."

Figure 4:
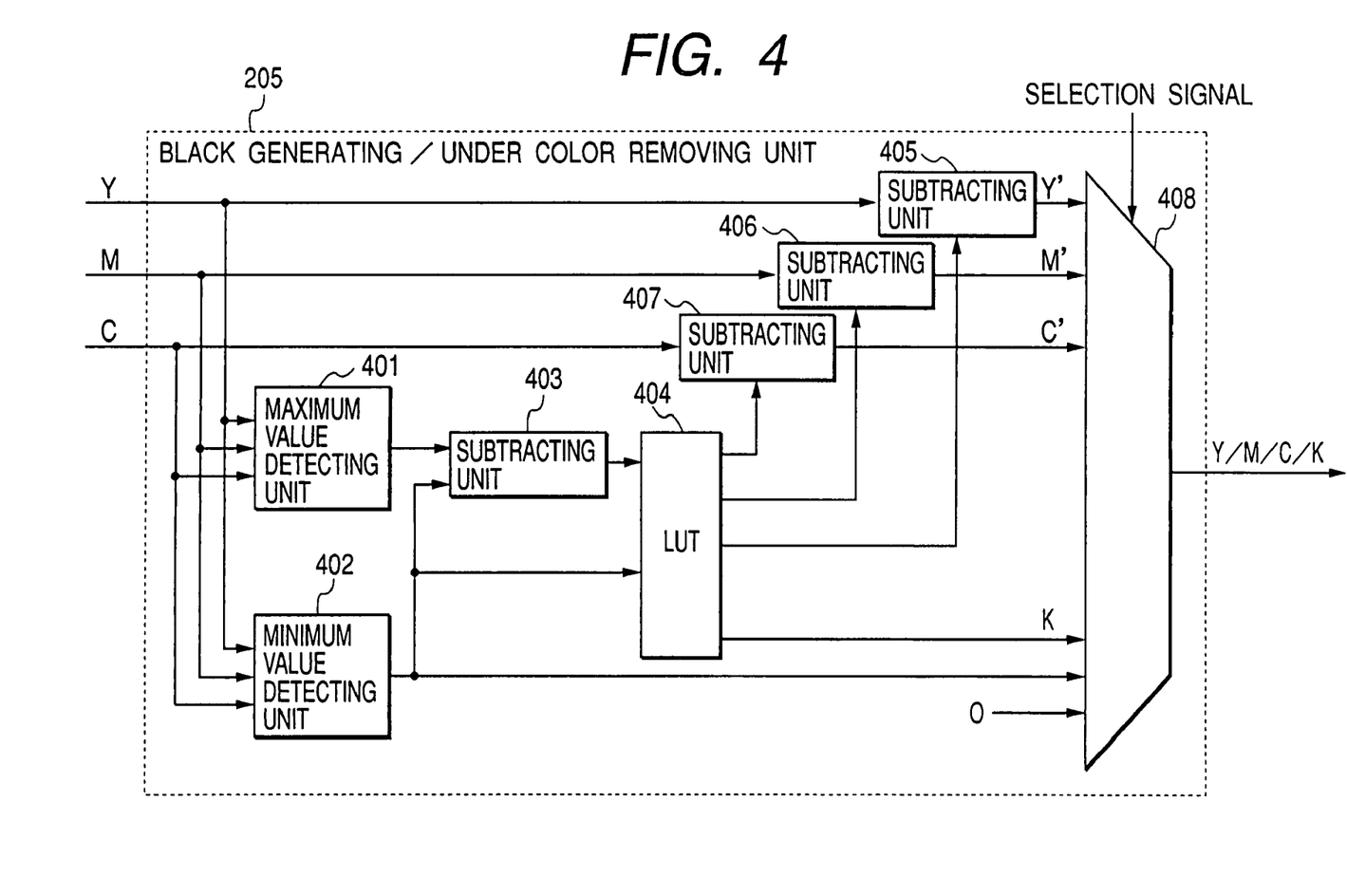
FIG. 4 is a block diagram showing a configuration example of a black generating/under color removing unit 205.

FIG. 4 is a block diagram showing a configuration example of the black generating/under color removing unit 205. In the same figure, the black generating/under color removing unit 205 comprises a maximum value detecting unit 401, a minimum value detecting unit 402, a subtracting unit 403, an LUT (look-up table) 404, subtracting units 405, 406 and 407, and a selector 408.

The maximum value detecting unit 401 detects a maximum value from inputted YMC signals and provides it to one input terminal of the subtracting unit 403. The minimum value detecting unit 402 detects a minimum value from inputted YMC signals and provides it to the other input terminal of the subtracting unit 403 and also to the LUT 404. The subtracting unit 403 calculates a difference between the maximum value and the minimum value and provides it to the LUT 404. The minimum value indicates a gray component, and the difference between the maximum value and the minimum value takes a value which indicates a saturation component.

In the LUT 404, black quantity K and under color removal quantities respectively for YMC colors are preset in accordance with the amount of the gray component and that of the saturation component. The LUT 404 outputs under color removal quantities for the colors and provides them to the subtracting units 405, 406 and 407, in accordance with the values of both inputted signals (the maximum-minimum value difference and the minimum value). The subtracting units 405, 406 and 407 subtract from the inputted Y, M and C signals the under color removal components of the colors outputted from the LUT 404, then calculate Y', M' and C' and provides them to the selector 408.

The selector 408 outputs Y/M/C/K signals in accordance with a selection signal which is generated in accordance with both the character decision signal outputted from the black character/color character detecting unit 204 and a print color signal (not shown) produced by the control unit 208. In the case where the character decision signal is indicative of a character other than black character, the selector 408 selects Y'→M'→C'→K signals as output signals in accordance with the print color signal in the system. If the character decision signal is indicative of a black character, the selector 408 outputs a reset ("0") at the time of printing Y/M/C colors, while at the time of printing K color, it outputs as a signal for black character the minimum value signal outputted from the minimum value detecting unit 402.

A-2. Operation of the First Embodiment

Now, the operation of the first embodiment will be described below with reference to FIG. 2.

In the image read unit 101, an original placed on an original carrying table (not shown) is scanned to produce RGB color image signals, which are fed to the image processing unit 102. In the image processing unit 102, first in the color correcting unit 201 color characteristic correction associated with an image input-output device is performed for the inputted RGB image signals and there are produced YMC signals. The YMC signals after the color correction, which signals are of 400 dpi and 8 bits/pixel in each color, are fed to the original information detecting unit 202, copy inhibit original recognizing unit 203, black character/color character detecting unit 204, and black generating/under color removing unit 205. The original information detecting unit 202 detects the size of the original, the position of the original on the original carrying table, and further detects whether the original image is a black-and-white image or a color image, then provides the result of the detection (original information) to the control unit 208.

In the copy inhibit original recognizing unit 203, if the printing mode is a black-and-white mode using K alone for printing, recognition is not performed as to whether a specific image is present or not, while if printing is conducted using three colors of YMC or four colors of YMCK, recognition is made as to whether a specific image is present or not. Recognition of the original is performed by the first and second original scans in the image read unit 101. The result of image recognition (original decision signal) obtained by the copy inhibit original recognizing unit 203 is fed to the control unit 208. In the black character/color character detecting unit 204, a lightness signal is produced from the YMC signals and color/black discrimination is performed, further, a character decision signal is fed to the black generating/under color removing unit 205 and the space correcting unit 207.

In the black generating/under color removing unit 205, Y/M/C/K signals are produced from inputted YMC signals in accordance with the character decision signal. Next, in the scaling unit 206, secondary scaling (expansion-contraction) processing is performed for the original image. In the space correcting unit 207, if the character concerned is judged to be a black character or a color character in accordance with the character decision signal, correction processing using a filter factor for enhancement is executed for the original image which has been subjected to the scaling processing, while otherwise there is performed correction processing using a filter factor for smoothing. As a result, characters and line drawings become sharper and pixels in a pattern area become smoother.

Next, in the image working unit 209, when the printing mode is a black-and-white mode using K alone and when there has been made no recognition by the copy inhibit original recognizing unit 203, or when printing is to be made using three colors of YMC or four colors of YMCK and when in accordance with the result of recognition (original decision signal) obtained by the copy inhibit original recognizing unit 203 the control unit 208 has judged that a copy inhibit object is not contained in the original image, there is not performed any image working for preventing the reproduction of a copy inhibit original image and the Y/M/C/K signals provided from the space correcting unit 207 are outputted as they are. On the other hand, when printing is to be performed using three colors of YMC or four colors of YMCK and when in accordance with the result of recognition (original decision signal) obtained by the copy inhibit original recognizing unit 203 the control unit 208 has judged that a copy inhibit object is contained in the original image, there is performed image working for preventing the reproduction of the copy inhibit original image. This is done at the time of the third original scan, so in the image working unit 209, the gradation of the C (Cyan) signal as a third printing color signal is inverted before output to prevent the reproduction of the copy inhibit image.

When page editing processing such as sorting, e.g. stacking or gathering, or image rotation, Nup, signature, or both-side printing is selected by the operating unit (not shown), the original image is stored in the image storing unit 103 irrespective of whether image working is performed by the image working unit 209. However, for example in the case of copying one sheet of an original only partially without requiring a temporary image storage, the original image is fed to the subsequent processing unit without being stored in the image storing unit 103.

The above operations are performed for all the originals (plural pages) placed on the original carrying table. When the foregoing page editing processing is selected, the original image is stored page by page in the image storing unit 103. In this case, if printing is to be performed using three colors of YMC or four colors of YMCK, the gradation of the C (Cyan) signal is inverted before the storage with respect to a page which has been judged to contain a copy inhibit object in the original image.

The page-by-page original image once stored in the image storing unit 103 is outputted to the image processing unit 102 in synchronism with the printing operation of the image output unit 104. In this case, when the original images are outputted from the image storing unit 103, they are outputted successively in a predetermined printing order and are subjected to a page editing processing selected by the operating unit (not shown) such as sorting, e.g. stacking or gathering, or image rotation, Nup, signature, or both-side printing. Now, with reference to FIGS. 6, 7 and 8, the following description is now provided about the page editing processing (sorting, image rotation, Nup, both-side printing) which is executed by the image storing unit 103.

Figure 6A:
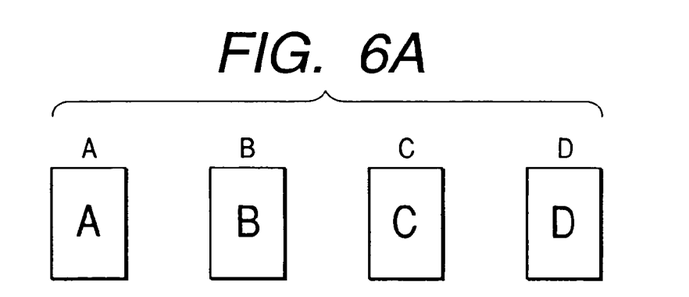
FIGS. 6A–6C are conceptual views for explaining a sorting function implemented by the image storing unit 103.
Figure 6B:
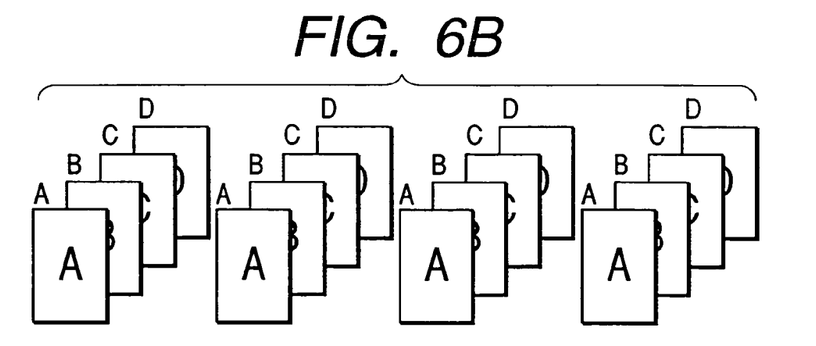
Figure 6C:
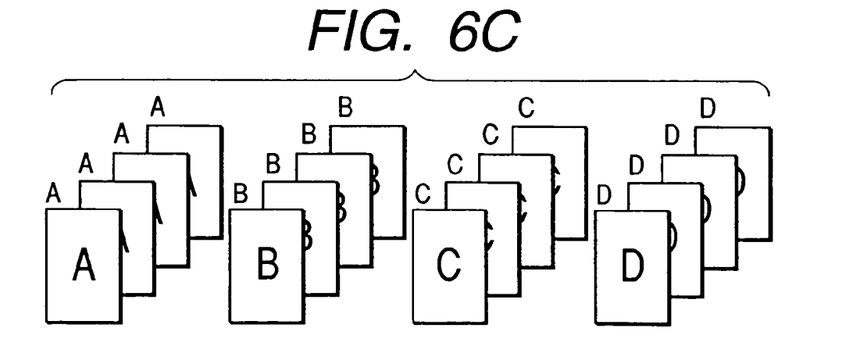

FIGS. 6A–6C are conceptual views for explaining the sorting function which is executed by the image storing unit 103. A description will now be given of the case where four copies are to be taken from each of such four sheets of originals as shown in FIG. 6A. FIG. 6B shows a copying example in a gathering mode and FIG. 6C shows an copying example in a stacking mode. In the gathering mode, original images are read in the image read unit 101 and are then are subjected to a processing for reproduction in the image processing unit 102. Subsequently, a printing operation is performed in the image output unit 104 for taking first copies and at the same time Y/M/C/K signals are fed to the image storing unit 103 for temporary storage of image data. As to the second to fourth copies, image data are read from the storing unit 214 in the order of first page (A) →second page (B)→third page (C)→fourth page (D), then are subjected to a decoding processing in the decoding unit 215, then are expanded to the page memory 216, and Y/M/C/K signals are outputted to the image processing unit 102 in synchronism with the printing operation of the image output unit 104.

In the stacking mode, when taking the first copy of each page, a printing operation is performed in the image output unit 104 and Y/M/C/K signals are fed to the image storing unit 103 for temporary storage of image data. For taking the second, to fourth copies, scanning of the original is not performed in the image read unit 101, but image data is read from the storing unit 214 and Y/M/C/K image signals are outputted to the image processing unit 102 in synchronism with the printing operation of the image output unit 104. This operation is repeated for the first page (A), second page (B), third page (C) and fourth page (D) to implement the stacking function.

Figure 7A:
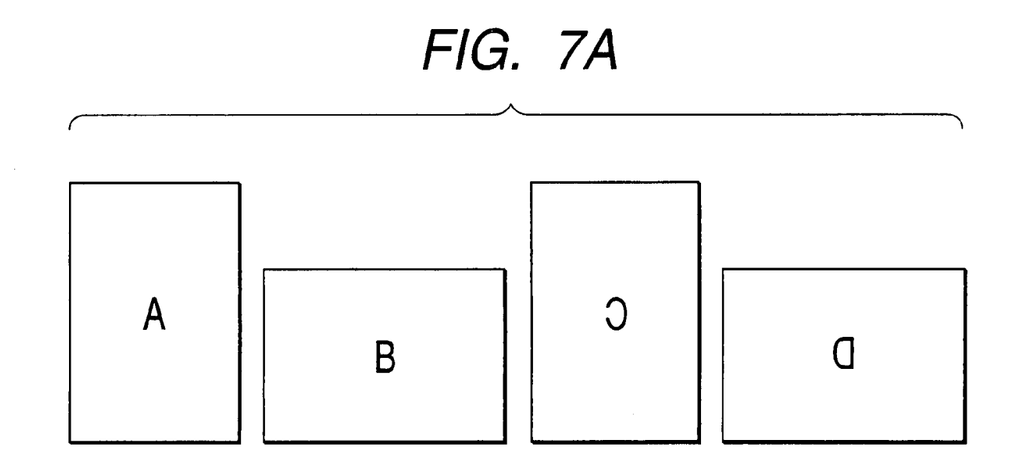
FIGS. 7A and 7B are conceptual views for explaining a rotating processing which is one of page editing functions.
Figure 7B:
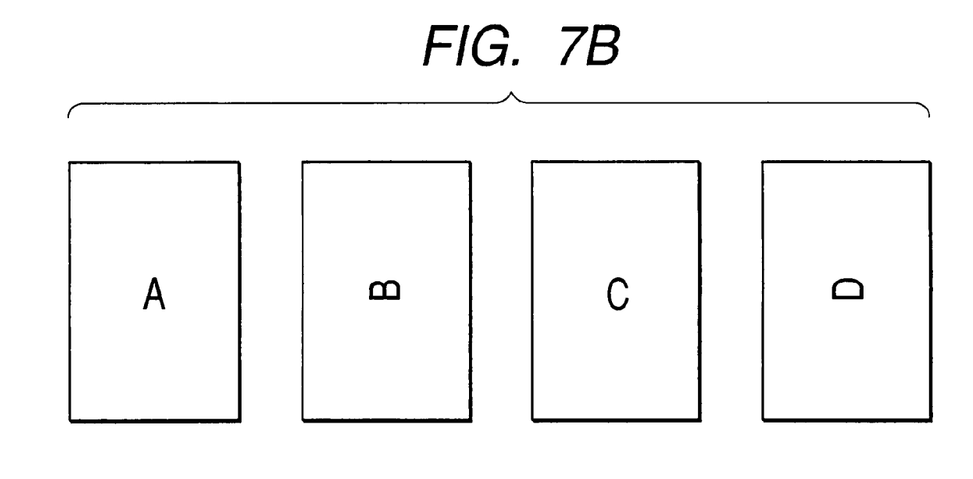

Reference is now made to FIGS. 7A and 7B, which are conceptual views for explaining image rotating processing as one of page editing functions. When original images are placed on the original carrying table (not shown) in such an irregular condition in their directions and up-down positions as shown in FIG. 7A and are read by the image read unit 101, image rotating processing is performed in the image storing unit 103 and it is thereby possible to obtain proper image output as shown in FIG. 7B. In addition, by performing the rotating processing so as to shorten the length in the subscanning direction it is made possible to improve the productivity of image copy. Information relating to the image rotating processing is obtained through designations made by the operator or from the original information detecting unit 202 and is stored in the storing unit 214 as a component of the image storing unit 103 page by page and in an associated manner with image data. The image rotating processing is implemented by controlling the address which is written at the time of expansion to the page memory 216 after reading and decoding of image data from the storing unit 214.

Figure 8A:
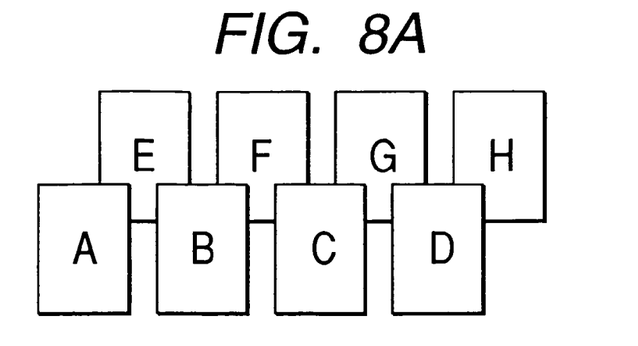
FIGS. 8A–8D are conceptual views for explaining page editing operations such as Nup and both-side printing.
Figure 8B:
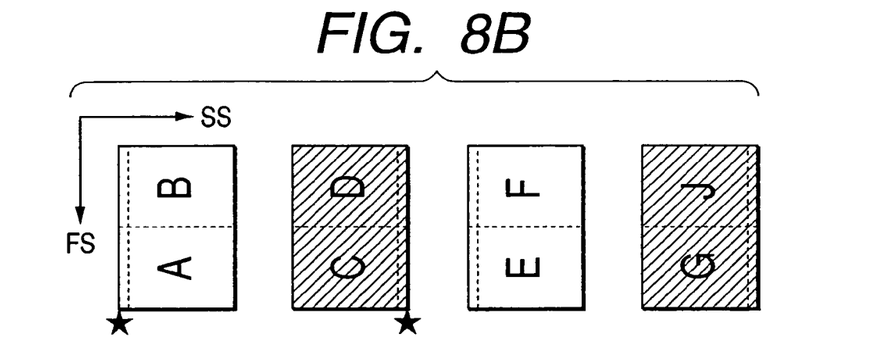
Figure 8C:
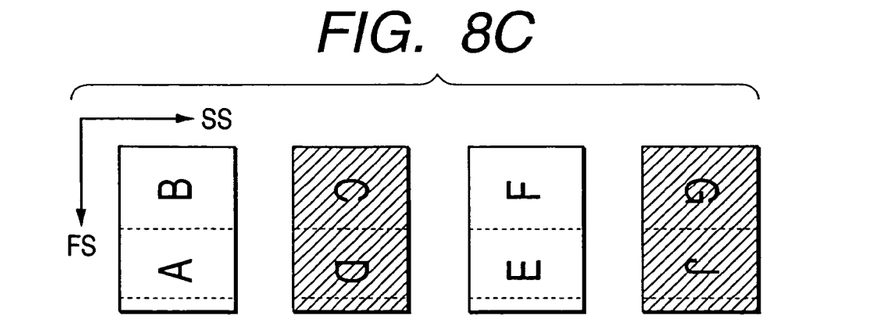
Figure 8D:
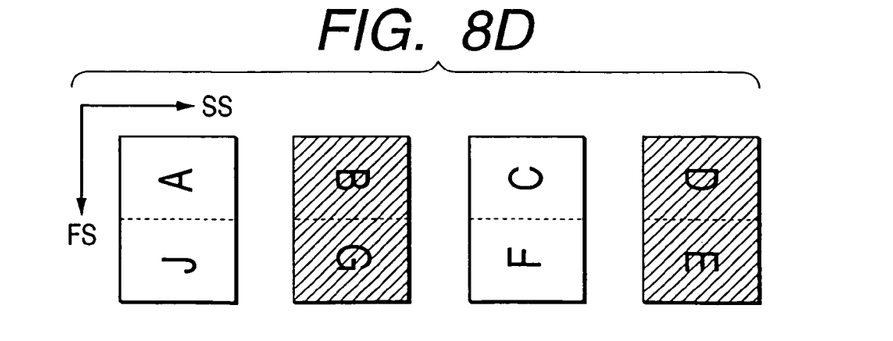

FIGS. 8A–8D are conceptual views for explaining page editing processing such as Nup or both-side printing. In the same figure, "FS" and "SS" sand for main scanning direction and subscanning direction, respectively, and shaded pages represent back sides in both-side printing. For example, in the examples of FIGS. 8B, 8C and 8C, the third page (C) and fourth page (D) are back sides of the first page (A) and second page (B), and the seventh page (G) and eighth page (J) are back sides of the fifth page (E) and sixth page (F). Thick broken lines shown in FIGS. 8B, 8C and 8D represent binding margins to be bound with, say, a stapler or an adhesive paste at the time of bookbinding. In both-side printing, printing paper after surface printing is once put on a predetermined tray and is thereafter inverted for back-side printing. In this first embodiment, the inversion of paper is made in such a manner that the star-marked position ((★)) of paper on which the first page (A) and second page (B) are to be printed in FIG. 8B is registered with the star-marked position ((★)) of paper on which the third page (C) and fourth page (D) are to be printed.

The eight sheets of originals are inputted as shown in FIG. 8A. FIG. 8B shows the arrangement of original images in a 2up copy mode with two pages of original images being arranged in order and in double-side printing designated. In FIG. 8C, double-side printing is to be performed also in a 2up copy mode, but a binding margin lies at the rightmost end of an output image, so in order that the top, bottom and right, left sides of each image may not be inverted at the time of output, the arrangement and up-down directions are controlled with respect to the pages to be printed on the back side, i.e., the third page (C) and fourth page (D) and also the seventh page (G) and eighth page (J). FIG. 8D shows a way of bookbinding in which an output image is bound at a central position. In this case, unlike the examples shown in FIGS. 8B and 8C, the order of original images stored in the image storing unit 103 and that of images read out from the image storing unit 103 become entirely different from each other.

In this way the image storing unit 103 prepares images page by page by changing the direction and arrangement of original images according to the set image copying mode and then outputs the images, thereby implementing various page editing functions.

The edge detecting unit 210 detects an edge pixel from each original image provided from the image working unit 209 or from the image storing unit 103 and thereby produces an edge decision signal of 1 bit each pixel which indicates whether the pixel concerned is an edge pixel or a non-edge pixel. The edge decision signal is fed to the gradation correcting unit 211 and the halftone generating unit 212. In the gradation correcting unit 211, the gradation characteristic of each output image is corrected, while in the halftone generating unit 212, a binary image signal for output to the image output unit 104 is produced from the original image (a multi-value image signal) and is fed to the image output unit 104. In the image output unit 104, in accordance with Y/M/C/K signals outputted from the image processing unit 102, printing is performed four times in the order of Y→M→C→K using toners of four colors: yellow (Y), magenta (M), cyan (C) and black (K).

In the above first embodiment, when the printing mode is a black-and-white mode using K alone, the discrimination of a specific original and the copy inhibit processing are not performed, which processing is performed when printing is made using three colors of YMC or four colors of YMCK. If it is judged that a copy inhibit object is contained in the original image, predetermined image working is conducted in the image working unit 209, whereby the reproduction of a specific copy inhibit original image can be prevented.

In the first embodiment, moreover, the storing of image data in the image storing unit 103 which performs page editing processing, including sorting function, is conducted after carrying out the reproduction preventing processing for a copy inhibit original, and therefore the reproduction preventing processing can be executed without being influenced by complicated image editing operations such as rotation and arrangement. Even in the event an original image other than the copy inhibit original should be judged to be a copy inhibit image, it is possible to minimize the influence on other originals and copying operation. Further, since the storing of image data is conducted after working on the original image, it is also possible to prevent the act of making access to the storing unit (storage medium) 214 as a component of the image storing unit 103 and taking out copy inhibit image data illegitimately.

Although the inversion processing described as reproduction preventing processing in the above first embodiment is for a specific color, this constitutes no limitation. It goes without saying that the same effect can also be obtained, for example, by painting out or resetting a specific color. Moreover, although in the first embodiment YMC signals obtained by subjecting RGB signals to color correcting processing are used as image signals inputted to the copy inhibit original recognizing unit 203, this does not constitute any limitation. It is needless to say that, for example, RGB signals or L*a*b* signals obtained by subjecting RGB signals to color correction may also be used as input signals to the copy inhibit original recognizing unit 203 and that also in this case there will be obtained the same effect.

B. SECOND EMBODIMENT

B-1. Constitution of the Second Embodiment

Figure 9:
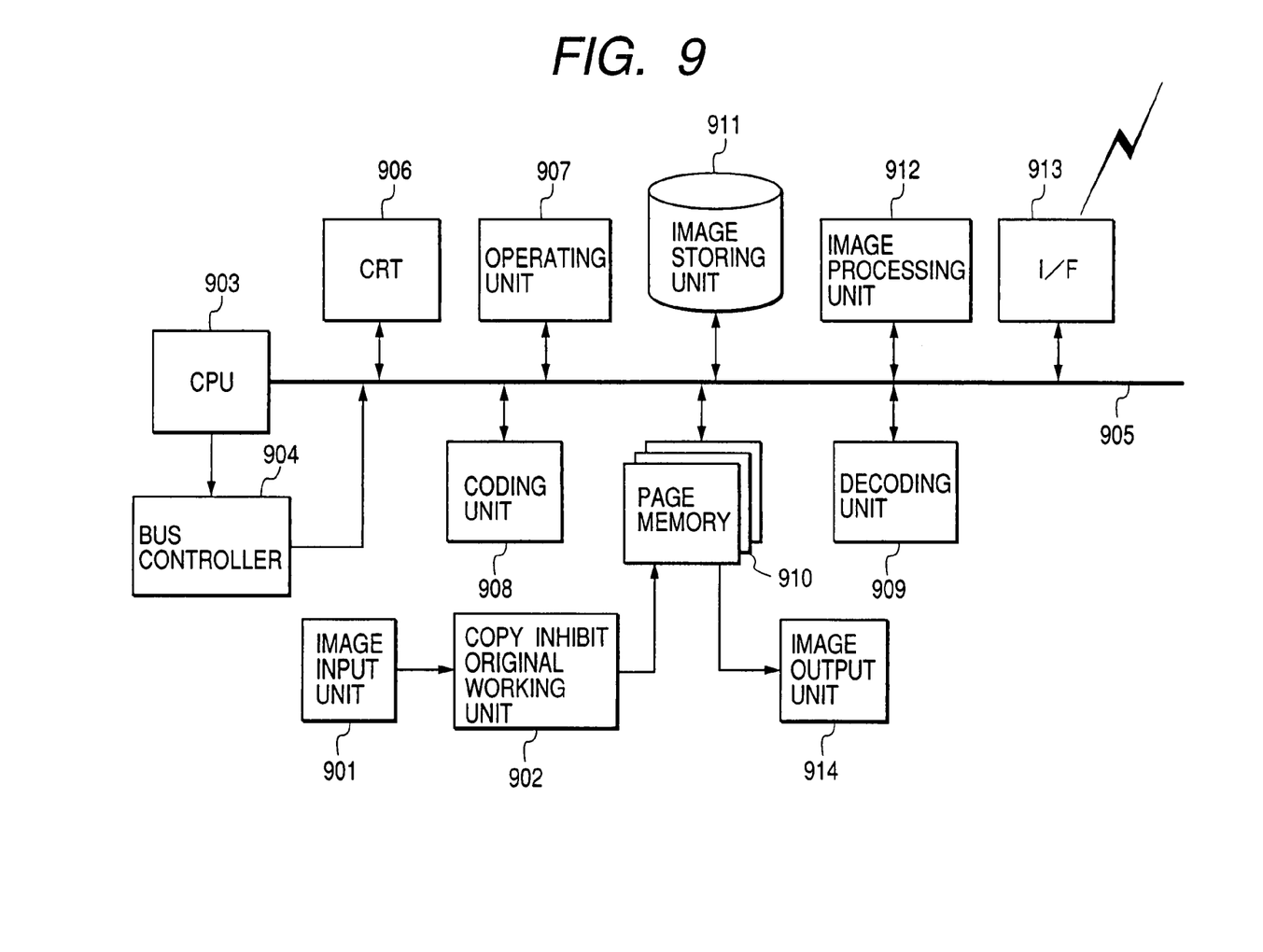
FIG. 9 is a block diagram showing the configuration of an image processing system according to the second embodiment of the present invention.

FIG. 9 is a block diagram showing the configuration of an image processing system according to the second embodiment of the present invention. In the same figure, the image processing system comprises an image input unit 901, a copy inhibit original working unit 902, a CPU 903, a bus controller 904, a bus 905, a CRT 906, an operating unit 907, a coding unit 908, a decoding unit 909, a page memory 910, an image storing unit 911, and an image processing unit 912.

Figure 10:
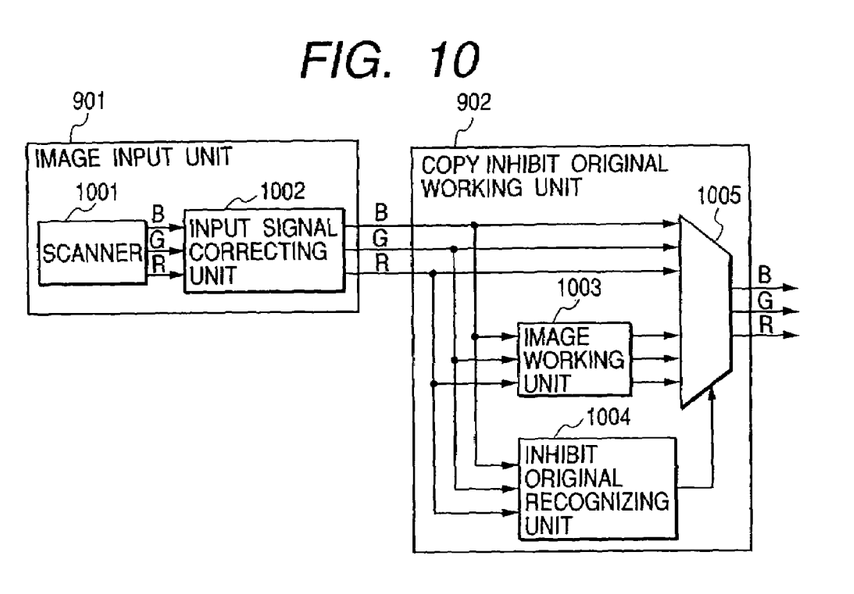
FIG. 10 is a block diagram showing a configuration example of an image input unit 901.

As shown in FIG. 10, the image input unit 901 comprises a scanner 1001 which scans an original image and which produces electric signals as color-separated signals into three primary RGB colors, and an input signal correcting unit 1002 which corrects the characteristics of the three primary RGB signals. The copy inhibit original working unit 902 comprises an image working unit 1003, an inhibit original recognizing unit 1004, and a selector 1005. The CPU 903 and the bus controller 904 control various components in accordance with instructions given by the operator through the operating unit 907. The CRT displays the images held in the page memory 910.

The operating unit 907 inputs information necessary for image working and editing through a pointing device such as a mouse or a digitizer or a keyboard. The coding unit 908 encodes image data stored in the page memory 910 in accordance with a predetermined compressing method and provides the thus-coded image data to the image storing unit 911 via BUS 905. The decoding unit 909 reads via BUS 905 the image data stored in the image storing unit 911 and coded by the predetermined compressing method, then decodes the read data and provides the decoded data to the page memory 910.

The page memory 910, which holds one page of image data in three RGB colors, writes images in synchronism with the processing operations of the image input unit 901 and the copy inhibit original working unit 902 and reads out images in synchronism with the processing operation of the image output unit 914. An interface 913 uses the page memory 910 as a buffer and performs the transmission and reception of data via a network.

Figure 11:
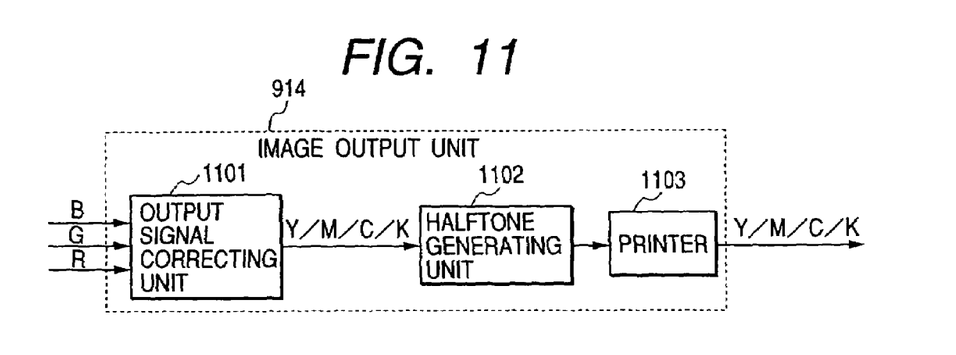
FIG. 11 is a block diagram showing a configuration example of an image output unit 914.

The image storing unit 911 is a large capacity storage part capable of storing plural sheets of originals and images and is implemented by a hard disk or the like. At the time of reading stored image data from the image storing unit 911 and the page memory 910, the image processing unit 912 makes various adjustments or page editing operations, including image rotation, trimming, composing, arranging, color conversion, and image quality adjustment. As shown in FIG. 11, the image output unit 914 comprises an output signal correcting unit 1101 which produces YMCK signals for output from RGB image signals, a halftone generating unit 1102 which binarizes the YMCK signals, and a printer 1103 which prints a full-color image in accordance with the resulting binary data.

B-2. Operation of the Second Embodiment

In the above image processing system, when the operator puts an original on the scanner 1001 and reading of the original image is instructed through the operating unit 907, the original image is read by the scanner 1001 and is stored in the image storing unit 911. Thereafter, the operator causes the read original image to be displayed on the CRT 906, with composing processing or working processing being applied to the original image in the image processing unit 912. Then, for example, an image present in a designated area is transmitted through the interface 913 to an external device connected to a network or is outputted from the printer 1103 in the image output unit 914. There may also be adopted processing such that image data acquired from an external device through the interface 913 is once stored in the image storing unit 911 and, after subjected to correction processing in the image processing unit 912, is outputted from the printer 1103 in the image output unit 914.

Now, with reference to FIGS. 9, 10 and 11, a detailed description will be given below about the prevention of copying a copy inhibit original, with reference to FIGS. 9, 10 and 11.

The original image is scanned by the scanner 1001 and there are produced digital image signals of three primary RGB signals. In the input signal correcting unit 1002, for correcting the characteristics of the scanner 1001, calculation processing such as known gradation correction or masking is performed for the RGB image signals.

The RGB image signals thus corrected in the input signal correcting unit 1002 are fed to the image working unit 1003, inhibit original recognizing unit 1004 and selector 1005 in the copy inhibit original working unit 902. For preventing faithful reproduction of the original image, the image working unit 1003 paints out the original image in preset colors, or RGB colors, and thereafter provides the original image to the selector 1005. The inhibit original recognizing unit 1004 recognizes whether a copy inhibit original such as paper money or valuable securities is included in the original image fed from the image input unit 901 and then provides the result of the recognition as a selection signal to the selector 1005.

In the selector 1005, if the result of the recognition, which is made pixel by pixel in the inhibit original recognizing unit 1004, continues to indicate that an inhibit image is not contained in the original image, the RGB image data which is fed directly from the input signal correcting unit 1002 in the image input unit 901 and which has not been subjected to the image working, is selected and fed to the page memory 910, while if the recognition result indicates that an inhibit image is contained in the original image, the RGB image data having been worked on in the image working unit 1003 is selected and fed to the page memory 910. The RGB image data once stored in the page memory 910 is coded by the coding unit 908 and then stored page by page in the image storing unit 911.

For example, in printing image data stored in the image storing unit 911, image data is read out from the image storing unit 911 in synchronism with the processing operation of the image output unit 914, then is decoded by the decoding unit 909 and thereafter expanded to the page memory 910. At this time, if necessary, various adjustments or page editing operations, including image rotation, trimming, composing, arranging, color conversion, and image quality adjustment, are performed by the image processing unit 912. The image data expanded in the page memory 910 are fed to the image output unit 914, then printed by the printer 1103 and outputted.

For the transmission to an external device connected to a network, image data is read out from the image storing unit 911, then decoded by the decoding unit 909 and thereafter expanded to the page memory 910. Further, the image data expanded in the page memory 910 is compressed by a predetermined method in the coding unit 908 and thereafter transmitted to the external device on the network via the interface 913.

According to this second embodiment, as noted above, even in such a form of the system as not only is normally used for copying work but also is connected for use to an external device, it is possible to prevent illegitimate use of such image data as paper money and valuable securities.

According to the present invention, as set forth above, upon detection of a copy inhibit original, working is performed for preventing the reproduction of a copy inhibit image and thereafter the storing of image is executed, so even in a systematized and networked color copying system there accrues an advantage that the reproduction of a copy inhibit image can be prevented without sacrificing various page editing functions of the system. It is also possible to prevent the abuse of data using an external device connected to a network.

What is claimed is:

1. An image processing system comprising:
an image data generating part that scans an original image and generates image data corresponding to the original image;
a discriminating part that, using the image data generated by the image data generating part, discriminates whether a predetermined inhibit image is present in the original image or not;
a working part that, if it is judged by the discriminating part that the inhibit image is present in the original image, works on the image data to render an image distinctly different from the original image and then outputs the image data thus obtained, and that, if it is judged by the discriminating part that the inhibit image is not present in the original image, outputs the image data as it is generated by the image data generating part;
a storing part that stores page by page the image data outputted from the working part;
an output form inputting part that inputs an output form of the image data corresponding to each page of the original;
a control part that, in accordance with the output form inputted by the output form inputting part, controls in what order the image data stored in the storing part is to be read out; and
an image rotating part that, in accordance with the output form inputted by the output form inputting part, generates image data by rotating the image data stored in the storing part.

2. An image processing system comprising:
an image data generating part that scans an original image and generates original image data corresponding to the original image;
a discriminating part that using the original image data generated by the image data generating part, judges whether a predetermined inhibit image is included in the original image or not;
a working part that, if the discriminating part judges that the inhibit image is included in the original image, works on the original image data including the inhibit image data to render an altered image different from the original image at the time of scanning of the original image and then outputs the altered image data thus obtained, and that, if the discriminating part judges that the inhibit image is not included in the original image, outputs the original image data as it is generated by the image data generating part; and
a memory that electronically stores page by page the image data outputted from the working part,
wherein the working part inverts a gradation of at least one color signal of the inhibited image data portion to render the altered image.

3. An image processing method comprising:
inputting step of inputting original image data corresponding to an original image;
discriminating step of judging whether a predetermined inhibit image is included in the original image or not by using the original image data generated in the inputting step;
working step of, if it is judged at the discriminating step that the inhibit image is included in the original image, working on the original image data including the inhibit image data to render an altered image different from the original image at the time of inputting of the original image and then outputting the altered image data thus obtained, and
if it is judged at the discriminating step that the inhibit image is not included in the original image, outputting the original image data as it is; and
storing step of electronically storing page by page the image data outputted in the working step, wherein the step of working on the inhibit image data portion includes inverting a gradation of at least one color signal of the inhibited image data portion to render the altered image.

4. An image input system comprising:
an image data generating part that scans an original image and generates original image data corresponding to the original image;
a discriminating part that, using the original image data generated by the image data generating part, judges whether a predetermined inhibit image is included in the original image or not; and
a working part that, if the discriminating part judges that the inhibit image is included in the original image, works on the original image data including the inhibit image data to render an altered image different from the original image at the time of scanning of the original image and then outputs the altered image data thus obtained, and that, if the discriminating part judges that the inhibit image is not included in the original image, outputs the original image data as it is generated by the image data generating part,
wherein the working part inverts a gradation of at least one color signal of the inhibited image data portion to render the altered image.

5. The image input system according to claim 4, wherein the discriminating part includes a recognizing unit for recognizing image data representing the inhibit image and for judging whether the original image contains the image data representing the inhibit image.

* * * * *